United States Patent [19]

Agostinelli et al.

[11] Patent Number: 5,436,758
[45] Date of Patent: Jul. 25, 1995

[54] QUASI-PHASEMATCHED FREQUENCY CONVERTERS

[75] Inventors: John A. Agostinelli; Jose M. Mir, both of Rochester, N.Y.

[73] Assignee: Eastman Kodak Company, Rochester, N.Y.

[21] Appl. No.: 261,533

[22] Filed: Jun. 17, 1994

[51] Int. Cl.⁶ .............................................. G02F 1/37
[52] U.S. Cl. .................................. 359/332; 359/326; 385/122
[58] Field of Search .............................. 359/326–332; 385/122; 372/21, 22

[56] References Cited

U.S. PATENT DOCUMENTS

| | | | |
|---|---|---|---|
| 5,036,220 | 7/1991 | Byer et al. | 359/328 |
| 5,170,460 | 12/1992 | Arvidsson et al. | 385/122 X |
| 5,185,752 | 2/1993 | Welch et al. | 372/22 |
| 5,253,259 | 10/1993 | Yamamoto et al. | 372/22 |
| 5,295,218 | 3/1994 | Agostinelli et al. | 385/122 |
| 5,317,666 | 5/1994 | Agostinelli et al. | 385/122 |

OTHER PUBLICATIONS

Yamada et al, *Applied Physics Letters*, vol. 65, p. 435 published Feb. 1, 1993.

Matsumoto et al, *Electronics Letters*, vol. 27, p. 2040, published Oct. 24, 1991.

*Primary Examiner*—John D. Lee
*Attorney, Agent, or Firm*—Raymond L. Owens

[57] ABSTRACT

An optical frequency converter and method of making same is disclosed. The converter includes a nonlinear optical support having a homogeneous periodically domain reversed portion and an optical waveguide which traverses the surface of the support. At least a segment of the waveguide intersects the homogeneous periodically domain reversed portion of the support to achieve a quasi phase-matched nonlinear optical frequency conversion interaction. The domain reversed portion is selected to be compositionally indistinguishable from the remainder of the waveguide.

37 Claims, 2 Drawing Sheets

QUASI-PHASEMATCHED FREQUENCY CONVERTERS

FIELD OF THE INVENTION

The present invention relates to the nonlinear conversion of the frequency of optical radiation.

BACKGROUND OF THE INVENTION

Frequency conversion devices which use quasi-phasematching (QPM) in nonlinear optical waveguides are well known in the art. There are broadly two approaches used in order to establish the periodic structure required to achieve quasi-phasematching, those being chemical and electrical means. To date, the highest normalized conversion efficiencies for QPM second harmonic generation have been reported by Yamada et al, *Applied Physics Letters*, Vol. 65, p. 435 published Feb. 1, 1993, using electric field periodic poling in a waveguide in $LiNbO_3$. The device and method of Yamada, however, exhibit a number of difficulties. Only very short interaction lengths have been reported, which indicates that an inhomogeneity is present in the devices. This is an important issue since the absolute conversion efficiency of this type of device increases as the square of the interaction length. A second serious problem with the device and method of Yamada is the requirement of very thin substrate dimension (<200 μm). The small thickness is necessary to avoid dielectric breakdown during the electric field poling step. Such thin substrates are extremely fragile and lead to low yields in fabrication and low mechanical robustness in the finished devices. A basic problem with the device and method, which relates to the inhomogeneity cited above, concerns the electric field configuration used to periodically pole the device. Yamada et al use a finger electrode structure atop the single crystal $LiNbO_3$ wafer and a planar counter-electrode on the opposite face. A voltage applied between the top and bottom electrodes creates an electric field distribution having a spatially periodically varying magnitude beneath the finger electrode structure. The field is applied near room temperature. In some regions the field strength is high enough to reverse the ferroelectric polarization direction of the crystal, thus creating the periodically poled structure. In practice the process is difficult to control, there being a tendency for reversed domains to grow laterally during the poling process. This has required the use of pulsed field poling (pulsewidths in the vicinity of 100 μs were reported by Yamada et al). The high coercive field for $LiNbO_3$ (~20 V/μm) demands multi-kilovolt pulses. The short pulse duration makes use of the field dependent kinetics of domain wall growth to try to control the poling process. The criticality of the process together with the relatively small modulation depth of the electric field strength as a function of position under the patterned electrode are problematic. When combined with inherent imperfections in material or fabrication, periodic structures which are sufficiently uniform to give only very short interaction lengths in the SHG process are the result. Yamada reports an interaction length of only 3 mm. The process would be much easier to control if the periodically varying electric field distribution had much greater modulation depth. Moreover, the criticality of the periodic poling procedure could be dramatically reduced if the electric field distribution was made to periodically change sign as well as magnitude beneath an electrode structure.

Matsumoto et al, *Electronics Letters*, Vol. 27, p 2040, published Oct. 24, 1991 discloses an electric field poling method and device for QPM frequency conversion. Matsumoto et al employs an interdigital electrode structure to create a periodic electric field, however the reference discloses a poling process which requires a temperature of 600° C. or above. At temperatures employed by Matsumoto et al, several problems are attendant. First, at these temperatures, useful nonlinear materials conduct significant currents. Also, Matsumoto et al reports a corrugation on the nonlinear substrate surface caused by the poling process. Such a corrugation is undesirable since it results in waveguide power loss. It is well known that at temperatures employed by Matsumoto et al and particularly in the presence of an applied electric field, metal from electrodes can diffuse into the nonlinear substrate material. Such metal migration can alter the optical properties of the nonlinear material. In particular, a discoloration of the material beneath the electrodes has been reported. The change results in absorption losses in the nonlinear waveguide.

SUMMARY OF THE INVENTION

It is an object of the present invention to provide for improved frequency conversion.

This object is achieved by an optical frequency converter comprising:
(a) a nonlinear optical support having a homogeneous periodically domain reversed portion; and
(b) an optical waveguide which traverses the surface of said support wherein at least a segment of said waveguide intersects the homogeneous periodically domain reversed portion of the support to achieve a quasi phase-matched nonlinear optical frequency conversion interaction, the domain reversed portion being compositionally indistinguishable from the remainder of the waveguide, and wherein the phase-matched nonlinear interaction occurs over a length in the range of 4 mm to 50 mm.

The object is also achieved by waveguide quasi-phasematched frequency conversion devices and to methods for their fabrication whereby an electric field distribution is set up within the ferroelectric nonlinear material, the field distribution being characterized by a periodically strongly varying magnitude and preferably a periodically changing sign as well, as a function of position along the propagation direction within the waveguide region.

The electric field distribution is created by the application of a set of voltages near room temperature to an electrode structure which lies on the surface of the nonlinear material. The use of fringing fields removes the requirement of Yamada that the wafer thickness be below 200 μm, allowing any practical substrate thickness. The strongly varying nature of the electric field distribution provides confinement against undesirable lateral growth of reversed domain regions which is critically difficult to control in the method of Yamada. The improved field distribution allows the fabrication of uniform devices having longer interaction lengths and therefore higher conversion efficiencies. In addition, the invention relates to methods for achieving the optimum duty cycle for periodic poling, i.e. 50%, and to the frequency conversion devices produced by the methods.

Matsumoto et al failed to recognize the potential benefit of a strongly varying field distribution during poling and did not show a long nonlinear interaction length. They report an interaction length of only 1 mm. Also, Matsumoto et al reported only a third order QPM frequency converter, implying a difficulty in achieving an interdigital electrode pattern for first order QPM poling. Matsumoto et al reports a measured conversion efficiency which is a factor of three smaller than their theoretically predicted efficiency. Efficiency of frequency conversion would be improved if the interdigital electrodes were not, as taught by Matsumoto et al, of equal width. In choosing electrodes of equal width, Matsumoto et al ensured that the duty cycle of domain reversal would not correspond to the optimum value which is 50%.

In another aspect the invention teaches an alternative to interdigital electrodes for the formation of a periodic electric fringing field which relaxes the required feature size in order to achieve periodic poling for first order QPM.

In yet another aspect, the invention relates to a two step poling process in which a periodic fringing electric field distribution as described above is used to nucleate reversed domain regions near the surface of nonlinear optical support. A second field applied throughout the bulk of the substrate in the volume below and including the nucleated domain region is used to grow the reversed domains into the depth of the nonlinear support material.

In still a further aspect, the invention relates to methods and devices for QPM frequency conversion with an integrated frequency tracking and modulation means. U.S. Pat. No. 5,317,666 of Agostinelli et al, issued May 31, 1994 teaches the use of the electro-optic effect in QPM waveguide frequency converters to control the dispersive characteristics of the waveguide and, therefore, to control the phase-matching wavelength. The present invention teaches an improvement whereby the electrode structure used to achieve fringing field domain reversal is retained for use in frequency tracking or modulation of the nonlinear frequency conversion interaction. The poling electrodes so retained carry the significant convenience of auto-registration with the periodically poled domain structure.

In addition to QPM frequency conversion in surface modified monocrystalline ferroelectric waveguides such as proton exchanged $LiNbO_3$ waveguides, the invention as well applies to QPM frequency converters in deposited nonlinear optical thin film waveguides. Such devices are taught in U.S. Pat. No. 5,295,218 issued Mar. 15, 1994 to Agostinelli et al.

BRIEF DESCRIPTION OF THE DRAWINGS

An understanding of the devices and methods of the invention can be facilitated by reference to the FIGS.

DETAILED DESCRIPTION OF THE PREFERRED EMBODIMENTS

Figure 1:
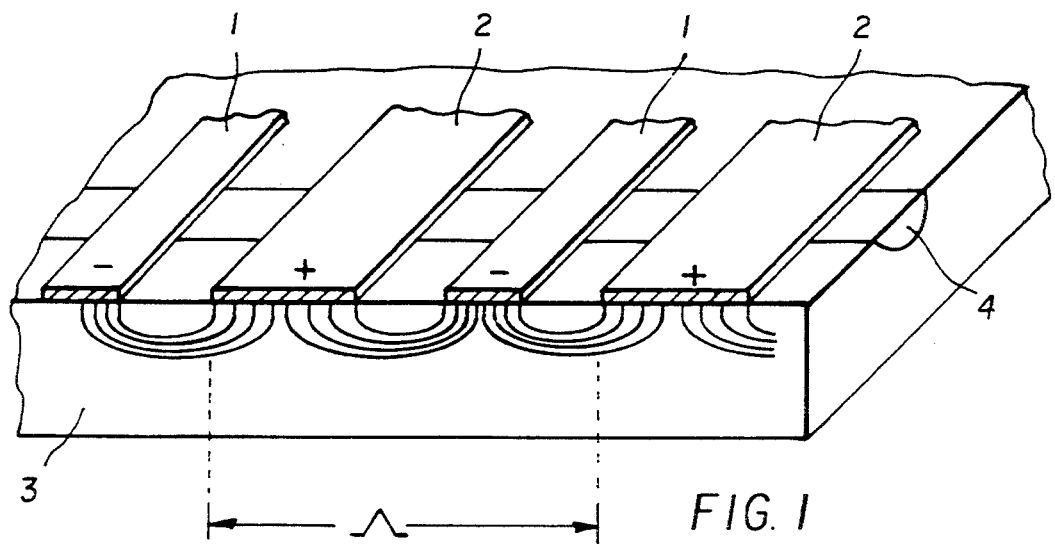
FIG. 1 depicts a typical interdigitated poling electrode arrangement according to the invention for achieving homogeneous periodic poling in the ferroelectric substrate.

A particularly preferred embodiment of a method of the invention can be understood with reference to FIG. 1. A pair of interdigitated electrodes 1 and 2 is fabricated on the surface of the nonlinear optical support 3. The nonlinear optical support 3 may initially be poled or unpoled, however, it is preferred that nonlinear material be initially in a single ferroelectric polarization state. The electrodes are preferably of a metal which has high electrical conductivity, good adhesion to the nonlinear optical material and is easily patternable. Exemplary electrode materials include aluminum, platinum, tantalum, and gold. Some electrode materials may require an adhesion promoting layer to assure good mechanical integrity and contact to the support. Exemplary adhesion layers include chromium or tantalum for gold electrodes and palladium for platinum electrodes. The materials may be deposited as thin films by techniques well known in the art such as vacuum evaporation, sputtering and the like.

The interdigitated electrodes 1 and 2 are patterned into the desired configuration by any of a number of techniques well known in the art. Particularly preferred patterning methods include conventional photoresist photolithography on the deposited electrode film followed by an etch process, wet or dry, to remove the film material in areas not protected by photoresist. Another preferred electrode patterning technique is the so called lift-off process whereby the electrode film is deposited on a pre-patterned photoresist image and the resist pattern is subsequently lifted off in a solvent leaving a patterned electrode on the support surface. The period of the electrode repeat cycle, $\Lambda$ is selected on the basis of the coherence length in the eventual channel waveguide 4 for the particular wavelengths involved in the desired nonlinear frequency conversion process to be implemented. The coherence length is the propagation distance over which the input and frequency converted guided waves accumulate a phase difference of $\pi$. The coherence length is a function of both material dispersion and waveguide modal dispersion and is typically of the order of a few $\mu m$. The period $\Lambda$ must be selected to be equal to an odd integer multiple of the coherence length at the wavelengths of interest for maximum frequency conversion efficiency. The applicable odd integer is referred to as the order of the quasi phase-matched interaction.

Theoretically the ideal conversion efficiency varies as the reciprocal of the square of the order of the quasi phase-matched interaction so that first order is preferred. A potential difference applied to the electrode pair gives rise to a field distribution in the nonlinear optical material. The field produced beneath one electrode will either oppose or support the existing ferroelectric polarization depending on the initial orientation of the ferroelectric and the polarity of voltage applied to that electrode. If the applied potential difference is large enough, the electric field strength in regions of the nonlinear support material where the field direction opposes the ferroelectric polarization can exceed the ferroelectric coercive field and a reversal of the ferroelectric polarization direction can result. Near room temperature, preferred nonlinear materials have very high coercive fields. A coercive field of about 20 kV/mm is found for $LiNbO_3$.

Given the electrode geometry of FIG. 1, such field strengths can be achieved with only several tens of volts applied. Poling temperatures somewhat above room temperature would also be useful without the disadvantages of the method of Matsumoto et al. Similarly, poling temperatures slightly below room temperature may also be used without increasing dramatically the coercive field strength. Thus poling temperatures in the range of 0° to 200° C. and preferably 5° to 50° C. are pertinent to the objects of the invention. Because of the spatially strongly varying nature of the fringing field along the propagation direction, lateral confinement of the reversed domain regions is assured. Also, because the effective thickness of the nonlinear material is only a few $\mu m$ in the geometry of FIG. 1, concerns of dielectric breakdown are eliminated, and the support material may have any convenient thickness. A useful thickness range for the nonlinear substrate is 0.25 mm to 2.0 mm. A particularly preferred thickness range would include 0.5 mm to 1.0 mm. Because of dielectric breakdown, the method of Yamada would be inapplicable in this thickness range, indeed, for thicknesses greater than about 200 $\mu m$ for $LiNbO_3$. The method of Matsumoto et al, given its very high temperature, would be disadvantageous for reasons already cited. In addition to the considerations already given, the duty cycle of the reversed domain fraction along the direction of propagation within the eventual waveguide is also important. The highest efficiency of frequency conversion occurs when the duty cycle of domain reversal is 50%. Thus the electrode geometry should be designed to produce a fringing field distribution which will give a 50% duty cycle for reversed domains near the surface of the nonlinear support.

For interdigitated electrodes as shown in FIG. 1, the required ratio of the widths of alternating polarity electrodes will be in the vicinity of 2:1 to 3:1, there being a dependence on the magnitude of the applied field. The wider electrode corresponds to that whose polarity will result in a reversal of ferroelectric polarization direction, that is, the electrode under which the applied electric field opposes the initial ferroelectric polarization. Matsumoto et al teaches the use of electrode widths having a ratio of 1:1 which would produce a domain reversal duty cycle near 25%. The non-optimum duty cycle would result in a significantly lower frequency conversion efficiency. According to the present invention the lateral growth of reversed domain regions is restricted by the strongly varying electric field profile, so that there are no restrictions on the maximum duration of the applied filed. A duration greater than that required to achieve reversal is the only requirement. For $LiNbO_3$, the minimum duration, though a field dependent quantity, is of the order of 100 $\mu s$ for practical field strengths. Since the electric field strengths are high in the air region in proximity to the electrodes, there may be a possibility of air breakdown during poling. Air breakdown can be avoided by performing the application of the poling field in vacuum or by overcoating the electrodes with a removable high dielectric strength insulator layer. After periodic domain reversal has been achieved, the electrodes and the insulator layer, if employed, are removed and device fabrication is continued as is known in the art for the fabrication of the channel waveguide 4, at least a segment of which incorporates the periodically domain reversed region. Waveguide formation could as well have been performed prior to the electroding and poling steps.

Figure 2:
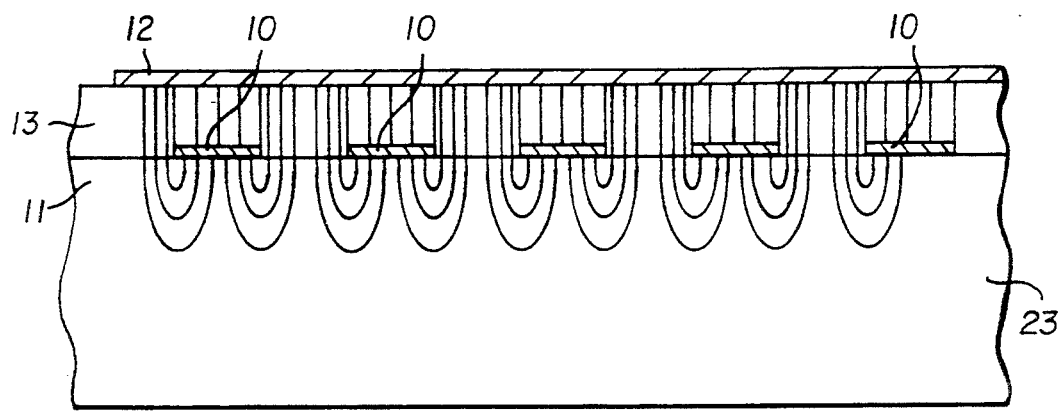
FIG. 2 depicts an alternative poling electrode arrangement according to the invention for achieving homogeneous periodic poling in the ferroelectric substrate.

Another method of the invention can be understood with reference to FIG. 2. The present poling method seeks to relax the difficulty of achieving high quality patterning of electrodes for first order QPM for short coherence length interactions. The method includes the formation of a finger electrode 10 on the surface of a nonlinear optical support 11, and an overlying planar counter-electrode, 12, the two electrodes being separated by an intervening dielectric layer 13. The method allows the formation of a 50% duty cycle for reversed domain regions using finger electrode segment widths and spaces with a dimension of approximately one coherence length instead of $\frac{1}{2}$ to $\frac{1}{3}$ of the coherence length as was preferred for the electrode widths in the embodiment of FIG. 1. Electrode materials and deposition and patterning methods described in the method of FIG. 1 are also applicable in the present embodiment. The dielectric layer material is selected to have a high permitivity and a high dielectric breakdown strength. Other considerations include the ease of high quality pinhole-free deposition of the layer and that the layer is free of cracking and peeling, and that it has a smooth surface. Exemplary dielectric materials for the layer include $Ta_2O_5$, $Nb_2O_5$, $Si_3N_4$, $SiO_2$, $TiO_2$, and $Al_2O_3$ alone or in combination of two or more. A preferred deposition method for the dielectric layer is rf sputtering, although many other techniques, for example, chemical vapor deposition, metalorganic decomposition, and pulsed laser deposition and the like may also be applied. For the purpose of achieving the highest fringing field strength in the nonlinear support material it is preferred that the dielectric layer thickness is small, preferably on the order of the finger electrode period or less. The present electrode geometry also yields a fringing electric field distribution having strongly varying magnitude and alternating sign as well. Again, field strengths above the coercive field (for $LiNbO_3$) are achievable with only several tens of volts applied to the electrodes. Similarly, this geometry allows the use of any convenient thickness for the nonlinear substrate.

Figure 3:
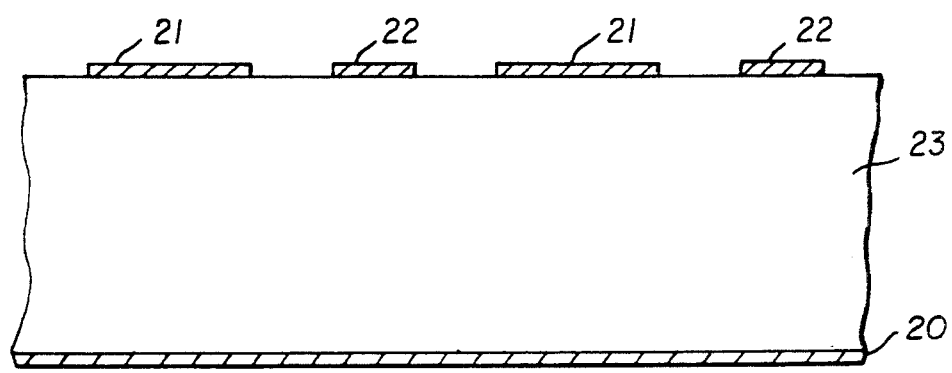
FIG. 3 shows an electrode according to the invention which combines the surface electrodes which provide a fringing-type field with a planar counter-electrode; this configuration permits nucleation of the reversed polarization domains via the fringing fields and the downward growth of the reversed domain regions via a field in the bulk provided by a voltage biasing of the counter-electrode.

FIG. 3 shows an alternative electrode embodiment whereby an underlying planar counter-electrode 20 is included on the bottom of the support 23. The underlying counter-electrode could be a deposited electrically conducting film or alternatively, it could be a conducting liquid in contact with the bottom of the support. An exemplary class of liquids for the instant method is that of the aqueous solutions of metal salts. Although the figure shows an interdigitated upper surface electrode set 21 and 22, the underlying counter-electrode could as well be included with upper surface electrodes of the type shown in FIG. 2. The method relevant to FIG. 3 is useful when reversed domains extending far below the surface of the nonlinear substrate are desired, for example, when the waveguide is weakly confining or when the intention is to do bulk (non-waveguide) QPM. The present method comprises two steps. First, the methods described with reference to FIGS. 1 or 2 are employed to nucleate reversed domains near the surface of the nonlinear substrate. Next an electric field applied between the surface electrodes and the underlying counter-electrode in the regions of domain reversal is used to grow the reversed domains deeper into the nonlinear support. The application of the fringing fields near the surface and a bulk field via the counter-electrode could be done simultaneously. The field dependent domain wall kinetics would still give a two step process of domain nucleation and subsequent growth. Although field strengths required for growth are below those for nucleation, they are still high enough that dielectric breakdown in the nonlinear substrate would still be problematic for some materials. Thus the method of FIG. 3 does carry limitations on substrate thickness. Its advantage over the prior art is in the homogeneity of the nucleated domains as result of the non-critical nature of the nucleation process owing to the strongly varying surface fringing field distribution.

Figure 4:
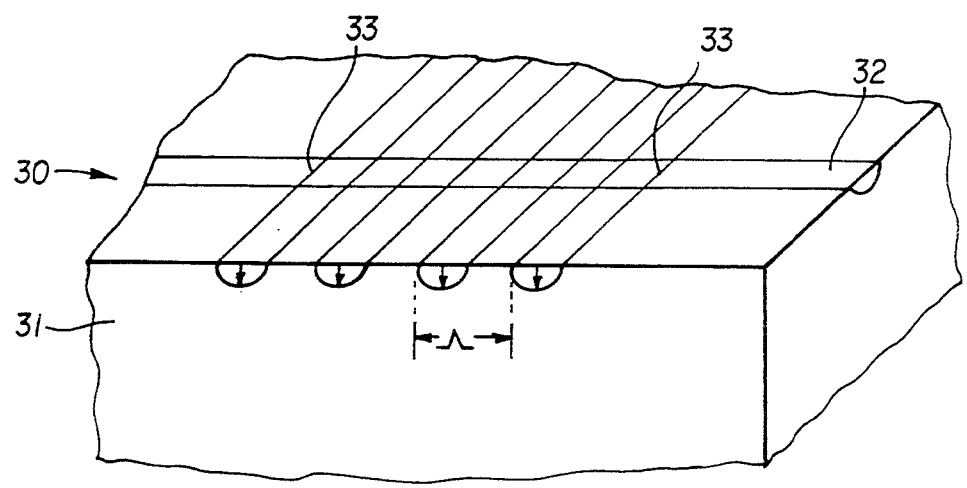
FIG. 4 is a schematic of a waveguide frequency converter device having a homogeneous periodically poled portion according to the invention.

Turning now to the device shown in FIG. 4. The device 30 is a completed QPM frequency conversion device. It includes a nonlinear support material 31 which could be a wafer of monocrystalline ferroelectric nonlinear optical material or a ferroelectric thin film material on a substrate material of lower refractive index. A channel waveguide portion 32 traverses the device. The channel waveguide intersects a periodically poled portion in a segment 33 having a length L. The periodically poled portion is characterized by a period of domain reversal, $\Lambda$. The period L is selected to be equal to an odd integer multiple of twice the coherence length of the nonlinear interaction of interest. Because the domain reversal was accomplished electrically according to the methods of the invention, the material comprising the segment 33 will be compositionally indistinguishable from the remainder of the channel waveguide. Because the poling process is accomplished through the use of fringing fields as described above, the substrate may have any convenient thickness. These two attributes, together with the longer interaction lengths afforded by the improved homogeneity of the poling process by the methods of the invention, distinguish the device 30 over the prior art. Interaction lengths in the range of 4 mm to 50 mm are useful for the purposes of the invention and a preferred range of interaction lengths is 5 mm to 25 mm.

Figure 5:
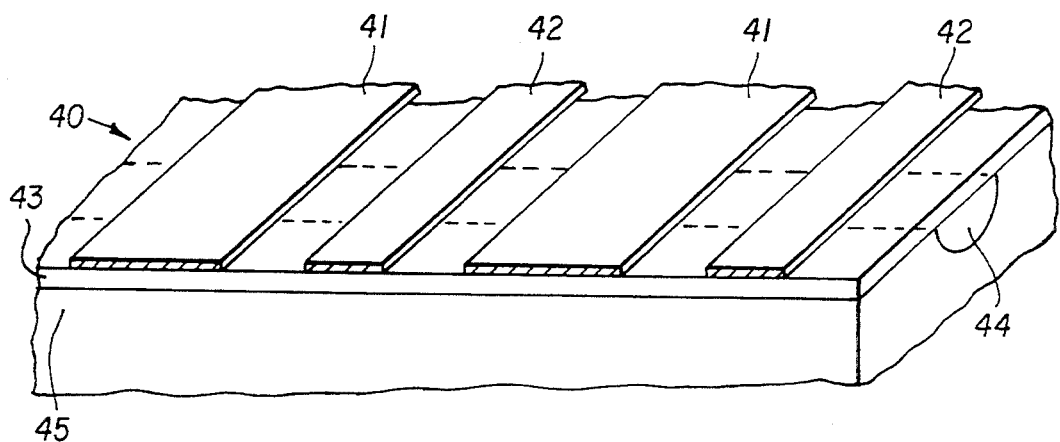
FIG. 5 depicts another frequency converter device in which the poling electrodes are retained for use for controlling the dispersive characteristics of the waveguide frequency converter and incorporates a transparent buffer layer material between the electrode portions and the waveguide.

FIG. 5 shows still another embodiment of the invention. A frequency converter device 40 is a QPM frequency converter fabricated according to previously stated methods of the invention which further incorporates an integral modulation or frequency tracking means. A channel waveguide 44 is fabricated on a nonlinear optical support 45 according to processes well known in the art. The waveguide traverses the surface of the nonlinear optical support material. Surface electrodes 41 and 42 are located atop a transparent buffer layer 43, the buffer layer being deposited as a thin film on the nonlinear optical support. It is required that the buffer layer be characterized by a refractive index having a lower value than the refractive index of the waveguide material. It is desirable that the buffer layer have low optical absorption and scattering losses. The buffer layer should be deposited in sufficient thickness to separate the evanescent field of the propagating waveguide modes from the electrodes in order to minimize optical waveguide propagation losses. Useful buffer layer materials include $Ta_2O_5$, $Nb_2O_5$, $Si_3N_4$, $SiO_2$, $TiO_2$, and $Al_2O_3$ alone or in combination of two or more.

A preferred deposition method for the buffer layer is rf sputtering although many other techniques for, example, chemical vapor deposition, metalorganic decomposition, and pulsed laser deposition and the like may also be applied. The electrodes are used according to the methods of the invention to produce the periodically poled portion 46 of the channel waveguide 44. The electrodes are retained, however, for use during operation of the frequency converter. A variable voltage may be applied between the surface electrodes 41 and 42 to either optimize or frustrate the nonlinear interaction by using the electro-optic effect to modify the dispersion of the nonlinear optical material thereby changing the wavelength for which the coherence length is equal to $\Lambda/2$. The surface electrodes 41 and 42 are conveniently in auto-registration with the periodically poled section of the waveguide where the QPM interaction takes place. The exact alignment between the tracking-/modulator electrodes and the periodically domain reversed portion achieved automatically in the present embodiment would be difficult and more costly to produce in a two step procedure wherein the electrode structure is post aligned to the domain reversed portion. In the present embodiment, the optimum conversion efficiency can be maintained independent of drift of input wavelength or change in temperature or the like by using an active control means comprising optoelectronic detection and feedback means to vary the voltage applied to the electrodes to maintain the phase-matching condition. Alternatively the frequency converter device 40 may be used to modulate the frequency converted output for a continuous wave input. As a modulator, the voltage applied to the surface electrodes 41 and 42 is used to alter the efficiency of the frequency conversion process from the optimum to a minimum near zero. The alteration may occur continuously to allow an analog modulation of the frequency converted output or it may occur discretely to give a digital frequency converted output. The active control means is also useful as an enhancement to the modulator function wherein the control means can be employed to set precisely the desired frequency converted power level.

The invention has been described in detail with particular reference to preferred embodiments thereof, but it will be understood that variations and modifications can be effected within the spirit and scope of the invention.

PARTS LIST 1 interdigitated electrode
2 interdigitated electrode
3 nonlinear optical support
4 channel waveguide
10 finger electrode
11 nonlinear optical support
12 overlying planar counter-electrode
13 intervening dielectric layer
20 underlying planar counter-electrode
21 interdigitated upper surface electrode
22 interdigitated upper surface electrode
23 support
30 device
31 nonlinear support material
32 channel waveguide portion
33 segment
40 frequency converter device 41 surface electrode
42 surface electrode
43 transparent buffer layer
44 channel waveguide
45 nonlinear optical support It is claimed:

1. A method for the fabrication of quasi phase-matched waveguide frequency converters comprising the steps of:
   providing a set of patterned electrodes on the surface of a nonlinear optical ferroelectric support, said support being in a single polarization state;
   poling by applying a voltage between said electrodes to produce a periodic fringing-type electric field in the near surface region of said support at a temperature selected to be in the range of 0°–200° C., said fringing field having sufficient strength to cause a periodic reversal of the ferroelectric polarization direction in said nonlinear optical support; and
   removing said electrodes from said support and forming a waveguide in said nonlinear optical support, at least a segment of which includes said periodically reversed region.

2. The method of claim 1 further characterized in that said set of patterned surface electrodes has unequal widths and includes interdigital electrodes.

3. The method of claim 1 further characterized in that said set of patterned electrodes have a common finger electrode on the surface of the nonlinear optical support and an overlying planar counter-electrode, said finger electrode and planar counter-electrode being separated by a dielectric layer.

4. The method according to claim 1 wherein said set of electrodes are selected to have unequal widths so as to produce a 50% duty cycle of periodically reversed ferroelectric polarization direction domains.

5. The method of claim 1 wherein the temperature during poling is in the range of 5° to 50° C.

6. The method according to claim 1 wherein the thickness of the nonlinear support is in the range of 0.25 mm to 2.0 min.

7. The method according to claim 1 further characterized in that the thickness of the nonlinear support is in the range of 0.5 to 1.0 mm.

8. The method of claim 1 wherein the waveguide formation step takes place prior to the poling step.

9. The method of claim 1 wherein the waveguide formation step takes place after the poling step.

10. A method for the fabrication of quasi phase-matched waveguide frequency converters comprising the steps of:
    fabricating a waveguide in a nonlinear optical support;
    depositing a transparent buffer layer on said support;
    fabricating a set of patterned electrodes on the surface of said buffer layer; and
    poling by applying a voltage between said electrodes to produce a periodic fringing-type electric field at a temperature far below the ferroelectric Curie temperature, in the near surface region of said support over an area including at least a portion of said waveguide, said fringing field having sufficient strength to cause a periodic reversal of the ferroelectric polarization direction in said nonlinear optical support.

11. The method of claim 10 further characterized in that said set of patterned surface electrodes has unequal widths and includes interdigital electrodes.

12. The method of claim 10 further characterized in that said set of patterned electrodes have a common finger electrode on the surface of the buffer layer and an overlying planar counter-electrode, said finger electrode and planar counter-electrode being separated by a dielectric layer.

13. The method according to claim 10 wherein said set of electrodes are selected to have unequal widths so as to produce a 50% duty cycle of periodically reversed ferroelectric polarization direction domains.

14. The method of claim 10 wherein the temperature during poling is in the range of 0° to 200° C.

15. The method of claim 10 wherein the temperature during poling is in the range of 5° to 50° C.

16. The method according to claim 10 wherein the thickness of the nonlinear support is in the range of 0.25 mm to 2.0 min.

17. The method according to claim 10 further characterized in that the thickness of the nonlinear support is in the range of 0.5 to 1.0 mm.

18. A method for the fabrication of quasi phase-matched waveguide frequency converters comprising the steps of:
    fabricating a set of patterned electrodes on the upper surface of a nonlinear optical ferroelectric support and an underlying planar counter-electrode on the opposite face;
    poling by applying a voltage between said upper electrodes to produce a periodic fringing-type electric field in the near surface region of said support material at a temperature far below the ferroelectric Curie temperature, said fringing field having sufficient strength to cause a periodic nucleation of domains having reversed ferroelectric polarization direction in said nonlinear optical support material;
    applying a second electric field between said underlying planar counter-electrode and one of said upper surface electrodes in order to grow said nucleated reversed domains into the depth of said nonlinear optical support; and
    removing said upper electrodes from said support and forming an optical waveguide in said support at least a segment of which includes said periodically reversed region.

19. The method of claim 18 wherein said set of patterned upper surface electrodes include interdigital electrodes.

20. The method of claim 18 wherein said set of upper surface electrodes have a common finger electrode on the surface of the nonlinear optical support material and an overlying planar counter-electrode, wherein said finger electrode and overlying planar counter-electrode are separated by a dielectric layer.

21. An optical frequency conversion device having an integral frequency tracking and modulation means comprising:
    (a) a nonlinear optical support having a uniform periodically domain reversed portion;
    (b) an optical waveguide which traverses the surface of said support wherein at least a segment of said waveguide intersects said uniform periodically domain reversed portion of said support to achieve a quasi phase-matched nonlinear optical frequency conversion interaction, said domain reversed portion being compositionally indistinguishable from the remainder of said waveguide, and wherein said phase-matched nonlinear interaction occurs over a length in the range of 4 mm to 50 mm; and (c) a fringing field generating electrode structure in alignment with said uniform periodically domain reversed portion and a transparent buffer layer separating the uniform periodically domain reversed portion of said optical waveguide from the electrode structure.

22. An optical frequency conversion device according to claim 21 including optoelectronic detection and feedback means for optimizing the efficiency of frequency conversion or for controlling the frequency converted power level.

23. The frequency conversion device according to claim 21 wherein the order of said quasi phase-matched interaction is equal to one.

24. The optical frequency conversion device according to claim 21 wherein said phase-matched nonlinear interaction occurs over a length in the range of 5 mm to 25 mm.

25. The optical frequency conversion device according to claim 21 wherein said phase-matched nonlinear interaction occurs over a length in the range of 6 mm to 10 mm.

26. The optical frequency conversion device according to claim 21 wherein said aligned electrode structure includes interdigital electrodes located on the surface of said buffer layer.

27. The optical frequency conversion device according to claim 21 wherein said electrode structure includes a dielectric layer, a common finger electrode on the surface of said buffer layer and an overlying planar counter-electrode, and wherein said finger electrode and planar counter-electrode are separated by said dielectric layer.

28. The device according to claim 21 wherein the thickness of the nonlinear support is in the range 0.25 mm to 2.0 mm.

29. The device according to claim 21 wherein the thickness of the nonlinear support is in the range 0.5 mm to 1.0 mm.

30. The device according to claim 21 wherein the electrodes are selected so as to produce a 50% duty cycle of periodically reversed ferroelectric polarization direction domains.

31. An optical frequency converter comprising:
(a) a nonlinear optical support having a uniform periodically domain reversed portion; and
(b) an optical waveguide which traverses the surface of said support wherein at least a segment of said waveguide intersects said uniform periodically domain reversed portion of said support to achieve a quasi phase-matched nonlinear optical frequency conversion interaction, said domain reversed portion being compositionally indistinguishable from the remainder of said waveguide, and wherein said phase-matched nonlinear interaction occurs over a length in the range of 4 mm to 50 mm.

32. The frequency converter according to claim 31 wherein the order of said quasi phase-matched interaction is equal to one.

33. The optical frequency converter according to claim 31 wherein said phase-matched nonlinear interaction occurs over a length in the range of 5 mm to 25 mm.

34. The optical frequency converter according to claim 31 wherein said phase-matched nonlinear interaction occurs over a length in the range of 6 mm to 10 mm.

35. The device according to claim 31 wherein the thickness of the nonlinear support is in the range 0.25 mm to 2.0 mm.

36. The device according to claim 31 wherein the thickness of the nonlinear support is in the range 0.5 mm to 1.0 mm.

37. The device according to claim 31 wherein the duty cycle of periodically reversed ferroelectric polarization direction domains is equal to 50%.

* * * * *